United States Patent Office 3,078,602
Patented Feb. 26, 1963

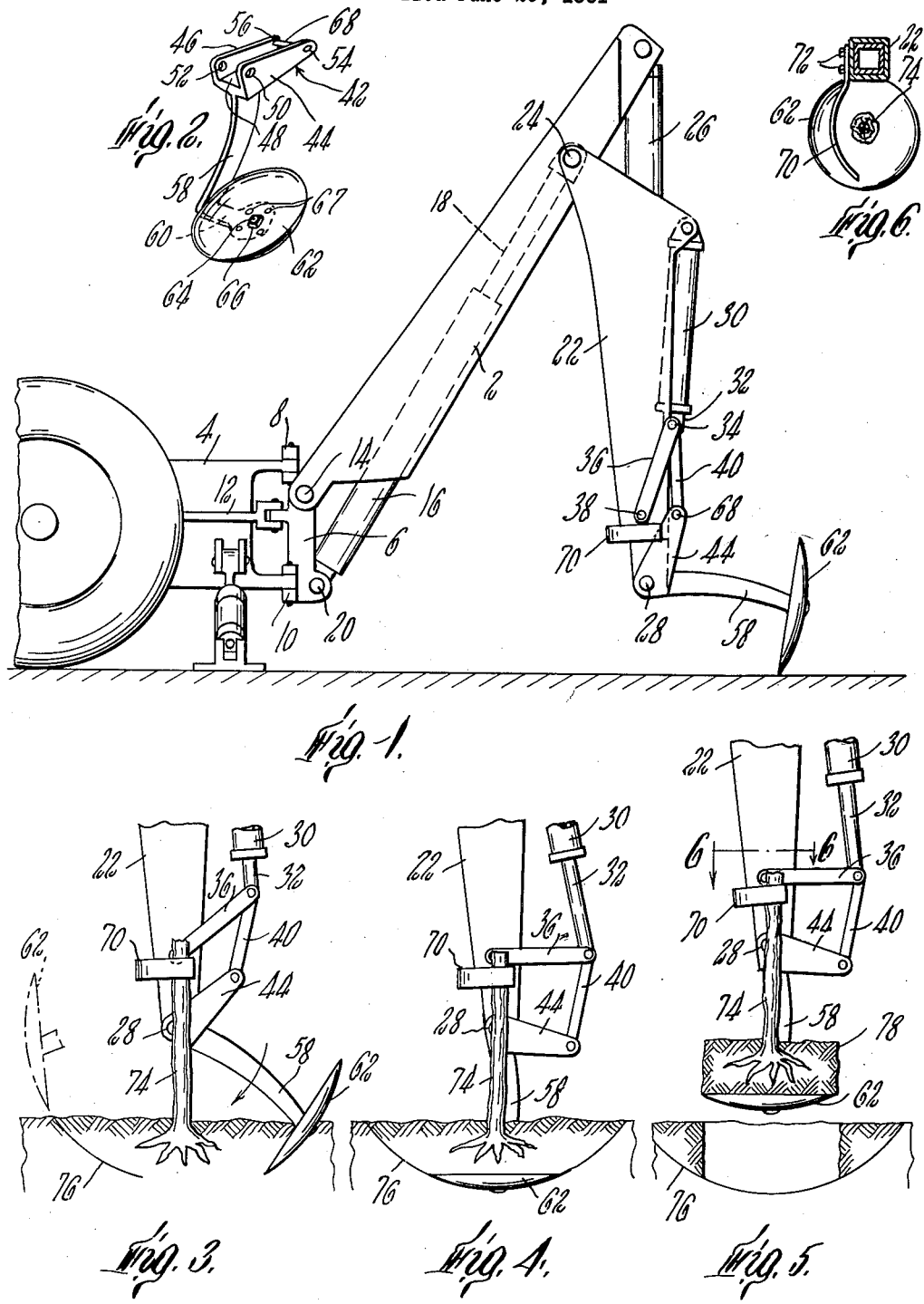

3,078,602
TRANSPLANTING IMPLEMENT
Vaino J. Holopainen, Rutland, Mass., assignor to Wain-Roy Corporation, Hubbardston, Mass., a corporation of Massachusetts
Filed June 29, 1961, Ser. No. 120,622
10 Claims. (Cl. 37—2)

The present invention relates to agricultural equipment and more particularly to an implement for use as an attachment to the conventional tractor back hoe for use in transplanting plants.

It is frequently necessary to transplant plants, such as trees and shrubs, as for the purpose of relocating ornamental plants or in connection with the growing of trees and other plants in a nursery.

Except in the case of the very smallest sizes, the transplanting of plants, particularly trees, is a difficult operation largely because it is necessary or desirable to remove from the ground, along with the tree, a substantial mass or ball of earth containing the tree roots. Even when this ball of earth is carefully separated from the ground by hand tools, the removal from the ground and transportation of the tree and the ball of earth, without breaking up the earth or damaging the tree, is difficult or impossible with conventional equipment, and the preparatory hand work is expensive. Lifting the tree and ball of earth by the tree trunk, as has been practiced in some cases, results in a certain amount of unavoidable injury to the bark of the tree. In general, present transplanting practices are laborious and expensive—expensive not only in the cost of transplanting but in the cost of the plants which do not survive transplanting.

Accordingly it is an object of the present invention to provide an improved apparatus for use in transplanting plants.

A further object of the invention is to provide an improved transplanting implement for use with conventional power operated equipment.

A further object of the invention is to provide a transplanting implement for use, as an attachment, with a conventional tractor back hoe.

A further object of the invention is to provide such a transplanting implement with which plants may be transplanted rapidly, at low expense.

A further object of the invention is to provide a power operated transplanting implement with which plants may be transplanted with less injury to the plant than has been possible heretofore with power equipment.

Other and further objects and advantages of the invention will become apparent from the following description of one presently preferred embodiment of the invention, in which description reference is made to the accompanying drawing, in which:

FIG. 1 is an elevation of a portion of a tractor with a back hoe attachment mounted thereon and with the transplanting implement of the invention in place on the back hoe;

FIG. 2 is a perspective view of the implement of the invention, detached from the back hoe;

FIG. 3 is a schematic elevation illustrating the initial steps in the use of the implement of the invention in transplanting a tree;

FIG. 4 is a view similar to FIG. 3 showing a subsequent step in the transplanting operation;

FIG. 5 is a view similar to FIG. 4 but showing a later step, and;

FIG. 6 is a horizontal sectional view on line 6—6 of FIG. 5.

In accordance with the invention I provide an implement of simple construction which may be mounted on and operated by a conventional back hoe attachment for a tractor to sever from the ground a ball of earth containing the roots of a plant and to lift the ball of earth from the ground with the plant remaining substantially undisturbed in the ball of earth. The plant and ball of earth then can be transported by the tractor to the new site and replaced in the ground.

Back hoe attachments for tractors are now well known and are shown, for example, in Patents Nos. 2,781,927, 2,768,759 and 2,698,697. Referring to the drawing, a conventional type of back hoe suitable for use in accordance with the invention comprises a boom 2 mounted on the frame 4 of a land vehicle, preferably a tractor for pivotal movement about vertical and horizontal axes. In the embodiment shown, the boom 2 is carried on a bracket 6 which in turn is mounted on the tractor frame 4 for swinging movement about the vertical axis through the hinge connections 8 and 10. The bracket 6 is adapted to be swung from side to side on the hinges 8 and 10 by means of an operating rod 12 and a similar rod, not shown, on the far side of the tractor, each rod being operated by a hydraulic cylinder and piston supplied with pressure fluid from the tractor hydraulic system, as is well known. The boom 2 is supported on the bracket 6 for vertical swinging movement about the horizontal axis of the hinge pin 14 and is so moved by means of an hydraulically-actuated cylinder-piston assembly comprising the hydraulic cylinder 16, containing a piston (not shown), and the piston rod 18. The cylinder 16 is pivotally connected at 20 to the bracket 6. The piston rod 18 is pivotally connected to the boom 2 at a point 24 well spaced above the pin 14.

Mounted on the boom 2 is a dipper stick 22, connected adjacent its upper end to the boom 2 for swinging movement in a vertical plane about the horizontal axis of a pin or pins 24. The dipper stick 22 is moved about the axis of the pin 24 by means of a hydraulically-actuated cylinder-piston assembly comprising cylinder 26 and its piston and piston rod (not shown) the lower end of which piston rod is pivotally connected to the dipper stick 22 at a point well spaced from the pin 24.

The lower end of the dipper stick normally carries a digging or earth moving attachment, typically a back hoe bucket. The bucket is pivoted on the lower end of the dipper stick on a pin 28, generally horizontally disposed. The bucket is adapted to be rocked or pivoted about the pin 28 in a "wrist" motion by means of an hydraulically-actuated cylinder-piston assembly comprising cylinder 30 and its piston 32 rod which is connected at 34 to an operating linkage which in turn is connected to the bucket or other attachment. The operating linkage comprises a first link 36 pivotally connected to the dipper stick at 38 and a second link 40 pivotally connected at its upper end at 34 to the link 36 and to the piston rod of the cylinder 30 and connected pivotally at its lower end to a point on the bucket spaced from the point on the bucket which is pivoted at 28.

The parts so far described are conventional. It will be understood that the tractor is provided with a hydraulic system controlled by hand-operated valves whereby pressure may be selectively applied to one or the other end of each of the pressure fluid cylinders 16, 26 and 30 to produce the various operating movements of the boom, dipper stick and link 40, to carry out the desired digging or other functions of the back hoe.

The implement of the present invention is capable of being attached to and operated by the conventional back hoe structure previously described.

The implement comprises a bracket 42 having a pair of spaced side plates 44, 46 connected by a plate 48. The plates 44, 46 are elongated as shown. Adjacent one end of the plate 44 is an opening 50 and in the corresponding end of the other plate 46 is an opening 52. The openings 50 and 52 are aligned with each other. Adjacent the other end of plate 44 is a second opening 54 and correspondingly in plate 46 a second opening 56, which second openings serve for connection of the implement to the link 40 of the back hoe.

Integrally connected to the plate 48 is an arm 58 extending generally at right angles to the axis of the openings 50 and 52. As shown, the arm 58 extends at an inclination to the long dimension of the elongated side plates 44, 46. Integral with the end of the arm 58 opposite its attachment to the plate 48 is a second arm 60 extending generally at right angles to the arm 58 and also extending generally parallel to the axis of the openings 50, 52.

Mounted on the second arm 60 is a dished circular disk 62. The disk 62 is connected to the arm 60 by means which permit the disk to be adjustably rotated about its center into different positions. For this purpose, the disk 62 is connected to the arm 60 by means of a bolt 64 and nut 66. Locating lugs 67 on arm 60 may be provided to hold the disk 62 against rotation once it has been mounted on the arm 60 in the desired position.

The arm 58 is of such length, with respect to the size of the other parts of the implement, that the distance between the bottom of the disk 62 and the axis of openings 50, 52 is equal to the radius of curvature or "dishing" of the disk. The disk 62 is so mounted on the implement that such radius intersects the axis of openings 50, 52.

The bracket 42 is adapted to be mounted on the lower end of the dipper stick 22 in place of the conventional back hoe bucket. The side plates 44, 46 of the bracket 42 are connected to the lower end of the dipper stick 22 by the pin 28 which passes through the openings 50 and 52. The opposite end of the side plates 44, 46 are connected to the links 40 by means of a pin 68 passing through the openings 54, 56 and through corresponding openings in the lower end of the links 40. The lower end of the dipper stick 22 preferably is provided with a curved bracket 70 detachably connected to the dipper stick as by bolts or machine screws 72.

The operation of the implement of the invention in transplanting a plant, such as a shrub or tree, is illustrated in FIGS. 3, 4, and 5, wherein the plant is a tree 74. The tractor is moved to the site of the tree 74, FIG. 3, and the back hoe operated so that the disk 62 is positioned with its edge against the ground at the near side of the tree, as shown in dotted lines in FIG. 3. The disk 62 may be placed in a suitable position, for example, by positioning the dipper stick 22 vertically in line with the trunk of the tree, as shown in FIG. 3. The cylinder 30 is then operated to force the disk 62 into the ground so that it makes a cut along the line 76 as the arm 58 is rotated about the pin 28. The back hoe controls are then manipulated to withdraw the disk 62, so that the disk returns along generally the same path 76 and is removed from the ground. The back hoe is then operated to place the disk 62 with its lower edge against the ground on the opposite, or far, side of the tree, as shown in full lines in FIG. 3. The cylinder 30 is then again operated to force the disk 62 into the ground and into the position shown in FIG. 4, the fact that the center of curvature is at the pin 28 facilitating movement of the disk 62 through the earth. The operator may swing the disk back and forth as required to sever from the ground a ball of earth 78 containing the roots of the tree. The boom, or boom and dipper stick, then are operated, with the disk 62 located beneath approximately the center of the tree, to lift the disk vertically from the ground as illustrated in FIG. 5. As the disk moves upwardly, it lifts with it the ball of earth 78 containing the tree 74.

The tractor with the tree in place on the disk 62 then may be moved to the site where it is desired to replant the tree. Preferably the site has been prepared beforehand by providing a trench or hole in the ground of a suitable size to receive the ball of earth 78. At the new site, the boom and dipper stick are operated to lower the disk 62 into the hole or trench at the point where it is desired to plant the tree. When the tree is in position the arm 58 is rocked, by movement of the piston in cylinder 30 to swing the disk 62 out of the ground in the same manner that it was entered into the ground along the line 76.

The bracket 70 serves during the transplanting operation to help to steady the tree and maintain it in place on the disk 62. The operator may, if he wishes, so manipulate the disk 62 as to cause the trunk of the tree 74 to lean against the bracket 70 so that he can thereafter move the boom and dipper stick and drive the tractor to the new site with more assurance that the tree will not become displaced.

The disk 62 may be rotated on the arm 60 from time to time to bring up a fresh sharp cutting edge into working position. When necessary the disk may be removed from the arm 60 for resharpening.

It will be seen from the foregoing that the invention provides a simple and dependable implement by which plants may be rapidly removed from the ground for transplanting and immediately transported to the new site and replanted in the ground. The implement removes the tree from the ground without any forceful contact with the trunk of the tree and with a minimum of disturbance of the earth in which the roots are embedded.

The bracket and arm assembly 42, 58 and 60 may be made either right handed or left handed, that is with the disk 62 disposed to the right of the bracket 42 as seen in FIG. 2, or to the left of the bracket 42.

It will be appreciated that the bracket 42 and its associated arms and other structure may take other forms than the particular form shown without departure from the invention.

The arm 58, for example, may be of other shapes than that shown in the drawings. Part or all of its edges may be sharpened to facilitate its movement through the soil. The linkage 36, 40 may be dispensed with and the operating piston rod 32 of cylinder 30 connected directly to the bracket 42 by the pin 68. While it is preferred that the disk 62 be of spherical shape, with a circular edge, this is not an essential feature of the invention as the disk may be of other shapes, and may have edges of other shapes, such as oval or even polygonal.

While the invention has been described particularly in connection with a tractor mounted back hoe, it will be understood that it equally is usable with cable-operated or other types of earth moving equipment which have the equivalent of the dipper stick described.

I claim:
1. An earth digging implement for use as a transplanting attachment to a back hoe, comprising a bracket having means for connecting the bracket to the lower end of a back hoe dipper stick for pivotal movement of the bracket with respect to the dipper stick, means on the bracket for connecting the bracket to an hydraulically-actuated cylinder-piston assembly of a back hoe, and a dished circular disk supported by said bracket for rotation on the bracket about the center of the disk, and with the concave face of the disk disposed toward said bracket.

2. An earth digging implement for use as a transplanting attachment to a back hoe, comprising a bracket having two spaced, elongated side plates, each plate having adjacent one end means for pivotally attaching the bracket to the lower end of a back hoe dipper stick, and each plate having adjacent its other end means for connecting the bracket to an hydraulically-actuated cylinder-piston assembly of a back hoe, an arm rigidly connected to said bracket and extending therefrom at an inclinaiton to the long dimension of said side plates, and a dished circular disk rotatably connected to said arm and extending generally at right angles to said arm, with its concave face disposed toward said bracket.

3. An earth digging implement for use as a transplanting attachment to a back hoe, comprising a bracket having two spaced, elongated side plates, each plate having adjacent one end a first opening aligned with the first opening in the other plate for pivotal attachment of the bracket to the lower end of a back hoe dipper stick, and each plate having adjacent its other end means for connecting the bracket to an hydraulically-actuated cylinder-piston assembly of a back hoe, an arm rigidly connected to said bracket and extending therefrom at an inclination to the long dimension of said side plates, and a dished circular disk rotatably connected to said arm and extending generally at right angles to said arm, with its concave face disposed toward said bracket.

4. An earth digging implement for use as a transplanting attachment to a back hoe, comprising a bracket having two spaced, elongated side plates, each plate having adjacent one end a first opening aligned with the first opening in the other plate for pivotal attachment of the bracket to the lower end of a back hoe dipper stick, and each plate having adjacent its other end a second opening aligned with the second opening in the other plate for connection of the bracket to an hydraulically-actuated cylinder-piston assembly of a back hoe, a first arm rigidly connected to said bracket and extending therefrom generally perpendicularly to the center line of said first openings and at an inclination to the long dimension of said side plates, a second arm rigidly connected to said first arm and extending generally at right angles thereto, and a dished circular disk rotatably mounted on said second arm and extending generally at right angles to said first arm, with its concave face disposed toward said bracket.

5. An apparatus for use in transplanting plants comprising a land vehicle, a boom pivoted on the vehicle for swinging movement in a vertical plane, a dipper stick connected to the boom for swinging movement with respect to the boom, means for imparting swinging movement to the boom, means for imparting swinging movement to the dipper stick, an arm pivoted at one end for swinging movement on the dipper stick at a position spaced from the connection of the dipper stick to the boom, and a dished circular disk mounted at the other end of said arm.

6. An apparatus for use in transplanting plants comprising a land vehicle, a boom pivoted on the vehicle for swinging movement about horizontal and vertical axes, means for selectively moving said boom about said axes, a dipper stick connected to said boom adjacent the upper end of the dipper stick for swinging movement with respect to the boom about a horizontal axis generally parallel to the horizontal axis of movement of said boom, means for moving said dipper stick, a bracket pivoted on said dipper stick adjacent the lower end of the dipper stick for swinging movement with respect to the dipper stick and a dished disk supported by said bracket with its concave face disposed toward said bracket.

7. An apparatus for use in transplanting plants comprising a land vehicle, a boom pivoted on the vehicle for swinging movement about horizontal and vertical axes, hydraulically-actuated cylinder-piston assemblies for selectively moving said boom about said axes, a dipper stick connected to said boom adjacent the upper end of the dipper stick for swinging movement with respect to the boom about a horizontal axis generally parallel to the horizontal axis of movement of said boom, an hydraulically-actuated cylinder-piston assembly for moving said dipper stick, a bracket pivoted on said dipper stick adjacent the lower end of the dipper stick for swinging movement with respect to the dipper stick about a horizontal axis, said bracket having thereon means for connecting the bracket to an hydraulically-actuated cylinder-piston assembly of the back hoe, and a dished circular disk rotatably supported by said bracket with its concave face disposed toward said bracket.

8. An apparatus for use in transplanting plants comprising a land vehicle, a boom pivoted on the vehicle for swinging movement about horizontal and vertical axes, hydraulically-actuated cylinder-piston assemblies for selectively moving said boom about said axes, a dipper stick connected to said boom adjacent the upper end of the dipper stick for swinging movement with respect to the boom about a horizontal axis generally parallel to the horizontal axis of movement of said boom, an hydraulically-actuated cylinder-piston assembly for moving said dipper stick, a bracket having two spaced, elongated side plates, each plate having adjacent one end means for pivotally attaching the bracket to the lower end of the back hoe dipper stick, for swinging movement of the bracket with respect to the dipper stick about a horizontal axis, and each plate having adjacent its other end means for connecting the bracket to an hydraulically-actuated cylinder-piston assembly of the back hoe, an arm rigidly connected to said bracket and extending therefrom at an inclination to the long dimension of said side plates, and a dished circular disk rotatably connected to said arm and extending generally at right angles to said arm, with its concave face disposed toward said bracket.

9. An apparatus for use in transplanting plants comprising a land vehicle, a boom pivoted on the vehicle for swinging movement about horizontal and vertical axes, hydraulically-actuated cylinder-piston assemblies for selectively moving said boom about said axes, a dipper stick connected to said boom adjacent the upper end of the dipper stick for swinging movement with respect to the boom about a horizontal axis generally parallel to the horizontal axis of movement of said boom, an hydraulically-actuated cylinder-piston assembly for moving said dipper stick, a bracket having two spaced, elongated side plates, each plate having adjacent one end a first opening aligned with the first opening in the other plate for pivotal attachment of the bracket to the lower end of the back hoe dipper stick for swinging movement of the bracket with respect to the dipper stick about a horizontal axis, and each plate having adjacent its other end means for connecting the bracket to an hydraulically-actuated cylinder-piston assembly of the back hoe, an arm rigidly connected to said bracket and extending therefrom at an inclination to the long dimension of said side plates, and a dished circular disk rotatably connected to said arm and extending generally at right angles to said arm, with its concave face disposed toward said bracket.

10. An apparatus for use in transplanting plants comprising a land vehicle, a boom pivoted on the vehicle for swinging movement about horizontal and vertical axes, hydraulically-actuated cylinder-piston assemblies for selectively moving said boom about said axes, a dipper stick connected to said boom adjacent the upper end of the dipper stick for swinging movement with respect to the boom about a horizontal axis generally parallel to the horizontal axis of movement of said boom, an hydraulically-actuated cylinder-piston assembly for moving said dipper stick, a bracket having two spaced, elongated side plates, each plate having adjacent one end a first opening aligned with the first opening in the other plate for pivotal attachment of the bracket to the lower end of the back hoe dipper stick for swinging movement of the bracket with respect to the dipper stick about a horizontal axis generally parallel to the horizontal axis of movement of said boom, and each plate having adjacent its other end a second opening aligned with the second opening in the other plate for connection of the bracket to an hydraulically-actuated cylinder-piston assembly of the back hoe, a first arm rigidly connected to said bracket and extending therefrom generally perpendicularly to the center line of said first openings and at an inclination to the long dimension of said side plates, a second arm rigidly connected to said first arm and extending generally at right angles thereto, and a dished spherical disk rotatably mounted on said second arm and extending generally at right angles to said first arm, with its concave face disposed toward said bracket and its center of curvature at said axis of swinging movement of said bracket.

References Cited in the file of this patent

UNITED STATES PATENTS

| | | |
|---|---|---|
| 2,652,639 | Kluckhohn | Sept. 22, 1953 |
| 2,880,894 | Walker | Apr. 7, 1959 |

FOREIGN PATENTS

| | | |
|---|---|---|
| 10,205 | Great Britain | May 4, 1904 |